Figure 5:
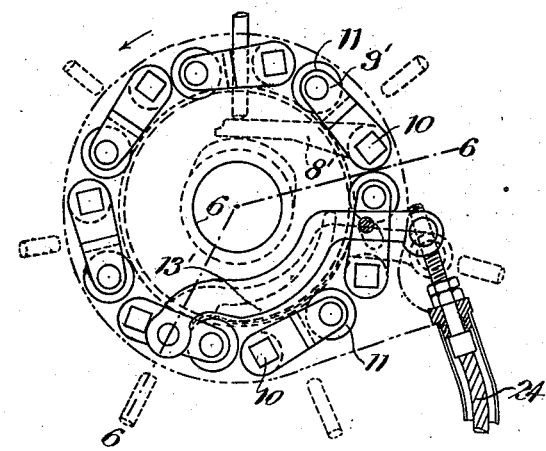

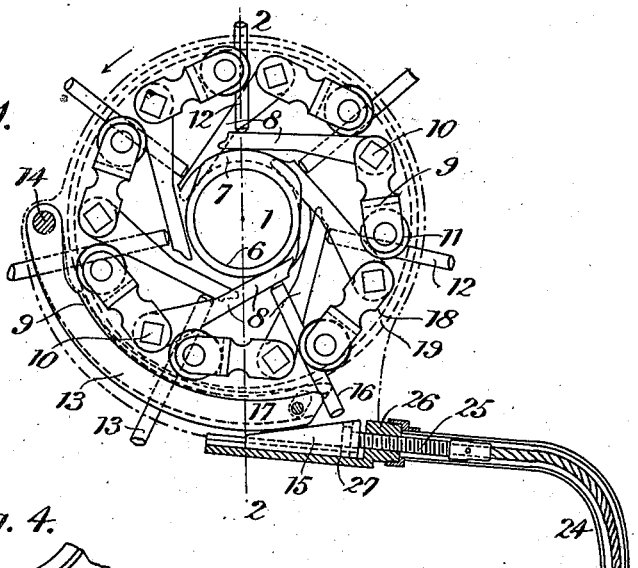
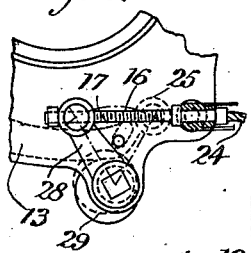
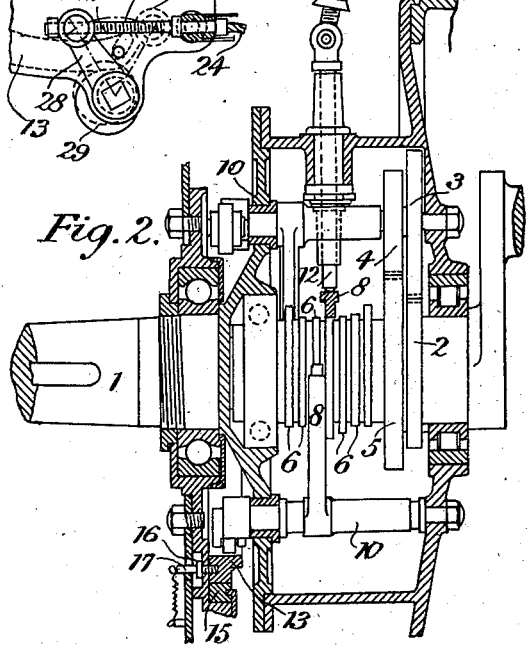
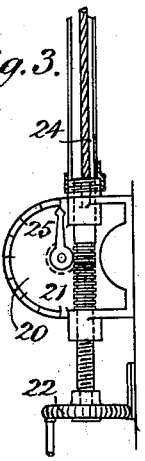

J. ZEITLIN.
VALVE MECHANISM OF INTERNAL COMBUSTION ENGINES.
APPLICATION FILED SEPT. 3, 1918.

1,402,701.

Patented Jan. 3, 1922.

3 SHEETS—SHEET 2.

Witnesses:

Inventor
Joseph Zeitlin
by
Attorney

J. ZEITLIN.
VALVE MECHANISM OF INTERNAL COMBUSTION ENGINES.
APPLICATION FILED SEPT. 3, 1918.

1,402,701.

Patented Jan. 3, 1922.
3 SHEETS—SHEET 3.

UNITED STATES PATENT OFFICE.

JOSEPH ZEITLIN, OF LONDON, ENGLAND.

VALVE MECHANISM OF INTERNAL-COMBUSTION ENGINES.

1,402,701.   Specification of Letters Patent.   Patented Jan. 3, 1922.

Application filed September 3, 1918. Serial No. 252,490.

(GRANTED UNDER THE PROVISIONS OF THE ACT OF MARCH 3, 1921, 41 STAT. L., 1313.)

*To all whom it may concern:*

Be it known that I, JOSEPH ZEITLIN, a subject of the King of England, residing in London, England, have invented certain new and useful Improvements in the Valve Mechanism of Internal-Combustion Engines, (for which I have filed an application in England, Oct. 18, 1916, Patent No. 125,664,) of which the following is a specification.

This invention relates to means for varying the amount and character of the mixture which is compressed in a constant compression space of an internal combustion engine, particularly of the rotating cylinder engine type.

The invention has for its particular object to improve the performance of internal combustion engines used for aeronautical purposes, as these engines, more than any other, suffer from large variations in the atmospheric conditions at different altitudes, with corresponding variations in the density and also the constitution of the air. Thus, at higher altitudes, for the same result a greater volume of air is required by reason of the diminished density and a still greater volume is required by reason of the smaller proportion of oxygen in the atmosphere at high altitudes.

Further, the means which are adopted for improving the economy and power of the engine under the above conditions also provide a simple method of varying the speed of the engine and of facilitating the starting of the same.

The invention relates to engines in which the cams for operating the exhaust valves in the normal working of the engines are placed side by side on a shaft driven by the engine and in which in addition to these cams, means are provided by which these valves can be opened during a controllable portion of the compression stroke to permit of the expulsion of part of the contents of the cylinders and thereby lessen the power developed by the engine when flying at low altitudes or when for other reasons a reduction in power is desirable.

For the purpose of opening the exhaust valves during the compression stroke an arc-shaped arm is pivoted at a fixed point, the arc being slightly eccentric to the shaft on which are placed the cams for the normal operation of the exhaust valves. The pivoted arm can be adjusted between two limiting positions, in one of which it has no effect, the opening and closing of the valves being determined entirely by the usual cams, while in the other limiting position the pivoted arm is arranged to open the valves during the compression stroke, so as to leave in the cylinders only sufficient charge to enable the engine to revolve.

The pivoted cam arm co-operates with a series of bell crank levers, fulcrumed upon the rotating part of the engine. One arm of each of these levers is preferably provided with a roller co-operating directly with the pivoted cam. These arms are thus all in the same plane. The other arms, on the contrary, are in different planes corresponding with the planes of the ordinary actuating cams of the exhaust valves of the engine, and are arranged to interpose, with or without rollers, between these cams and the valve tappets.

It will be obvious that for intermediate positions of the pivoted cam the period, as well as the amount, of opening of the exhaust valves, will be varied between the limits indicated.

In the case of stationary cylinder engines the pivoted cam or its equivalent will be revolved and means provided for advancing it towards or withdrawing it from the co-operating stationary bell crank arms within the working limits.

In the accompanying drawings, Fig. 1 is an end view of an example of a construction according to the invention for operating the exhaust valves of an internal combustion engine with rotary cylinders; Fig. 2 is a vertical section on the line 2—2 of Fig. 1. Fig. 3 shows a hand operated device for controlling the position of the pivoted cam arm which determines the opening of the exhaust valves during the compression stroke, and Fig. 4 is a slightly modified arrangement for this purpose.

Figure 6:
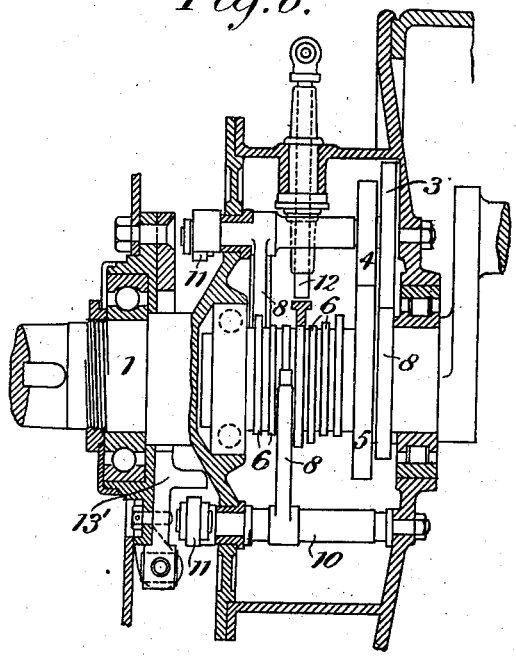
Figure 7:
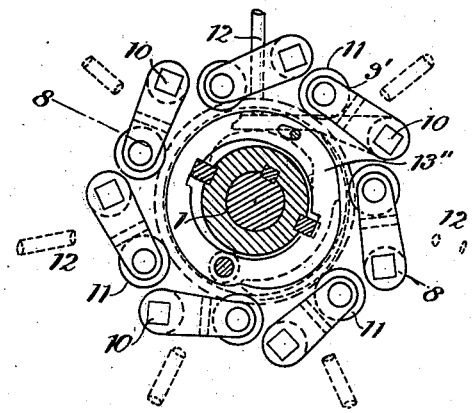

Fig. 5 is an end view and Fig. 6 a section on the line 6—6 of Fig. 5 of a modified disposition of the pivoted cam and the levers operating the exhaust valves. Fig. 7 is an end view and Fig. 8 a section on the line 8—8 of Fig. 7 of a construction adapted for an internal combustion engine with stationary cylinders.

Referring to Figs. 1 and 2, which represent a 7-cylinder engine, on the shaft 1 driven from the engine shaft by means of sun and planet wheels 2, 3, 4, 5 are seven cam discs 6 disposed in parallel planes on the shaft 1. The cam swell 7 of the centrally disposed cam is shown in engagement with one arm 8 of a bell crank lever 8, 9 attached to a rocking shaft 10; the arm 9 carries a roller 11 and it will be seen that the tappet rod 12 is operated to open the exhaust valve to which it is connected, either when the cam swell 7 is in engagement with the arm 8 of the bell crank lever, or when the roller 11 of the same lever is forced inwards by contact with a stationary cam arm 13 pivoted at 14. The cams 7 open the exhaust valves in the usual manner during the exhaust stroke, the pivoted cam 13 is adapted to open the valves during a portion of the compression stroke, the time during which a valve is opened and the extent of the opening depending upon the position imparted to the arm 13 by a sliding wedge-shaped member 15. Limiting positions of the arm are determined by a slot 16 at its free end engaging with a pin 17 secured to the stationary framework. In the most advanced position of the cam arm, the roller attached to each bell crank lever is forced inwards during a certain part of its travel past the cam 13 through a distance represented by the difference in the radii of the circles 18 and 19 and opens the corresponding exhaust valve to an equivalent extent. The contour of the arm is such that the valve is only opened for a portion of the compression stroke and the maximum opening is slightly less than the opening effected by the cams 6. In the extreme outward position of the free end of the arm, the exhaust valves are not opened during the compression stroke.

Fig. 3 shows an arangement by which the position of the arm 13 is adjusted to suit the requirements as regards speed, power or altitude.

Assuming that the engine is fitted on an aircraft, a dial 20 is marked in thousands of feet or barometric pressure altitude, a screw threaded rod 21 is turned by a hand wheel 22 until a pointer 23 gearing with the screw thread on the rod 21 points to the altitude attained. A flexible wire cable 24 is connected to the rod 21 and rotates with it; the threaded end 25 of the flexible cable turning in the nut 26 causes the wedge shaped member 15 to slide to and fro in the guide 27 in accordance with the amount and direction of the rotation of the hand wheel 22 and thereby to control the opening of the exhaust valves during the compression stroke, but not in any way to interfere with the operation of these valves during the exhaust stroke of the engine.

When flying at low levels where the density of the air and the proportion of oxygen are both greater, the pivoted arm would ordinarily be adjusted to open the exhaust valve during about 40 per cent of the compression stroke while for slow running the valve is kept open for longer periods; as the altitude attained increased, the pilot would adjust the sliding member 15, so as to reduce the extent of opening, until at the highest altitude, of about 10,000 feet or more the pivoted arm would be inoperative and the maximum amount of air retained to mix with the petrol. In the usual practice, the speed falls off at high altitudes on account of the lower power developed, in spite of the lessened resistance due to the rarer atmosphere. In the system according to the invention, as the power is maintained at approximately constant value, the speed increases with the height gained. It is found in practice that the longer the exhaust valves are opened the richer is the resultant mixture, showing that it is mainly air and very little petrol which escapes through the exhaust valves. This fact is also confirmed by tests of petrol consumption. It is obvious that it may also be convenient to the pilot to control the power absorbed at any time by the method described independently of the altitude at which he may be flying.

The screw threaded rod 21 may be automatically operated to maintain a predetermined speed by means of a centrifugal governor which in accordance with the speed of rotation brings the one or other of a pair of bevel wheels on a sliding sleeve to impart motion through suitable gearing to the threaded rod 21, an increase of speed beyond the predetermined amount causing the pivoted cam arm to be moved inwards to its operative position and a decrease of speed causing the arm to be withdrawn so as to lessen the period during which the exhaust valves are open. If this arrangement is adopted, it is advisable that a throw-over device should be provided, by which either the hand operated wheel, or the automatically operated gearing should engage with the rod 21, but which should prevent both methods of control from being in use at the same time.

Fig. 4 shows a modification in which the sliding wedge 15 is replaced by a cranked lever 28, which rotates a cam 29 to adjust the position of the cam arm 13.

In the construction shown in Figs. 5 and 6 the arms 8′, and 9 are differently disposed on the rocking shaft 10 and the cam arm 13 is arranged to contact with the inner instead of with the outer parts of the peripheries of the rollers 11. In this arrangement the free end of the arm is moved outwards in order to open the valves for a longer period or to a greater extent.

While this construction reduces the dimensions of the parts and the velocity at which the rollers engage with the stationary arm, the inertia of the moving parts is not so well balanced as in the construction illustrated in Figs. 1 and 2.

Figure 8:
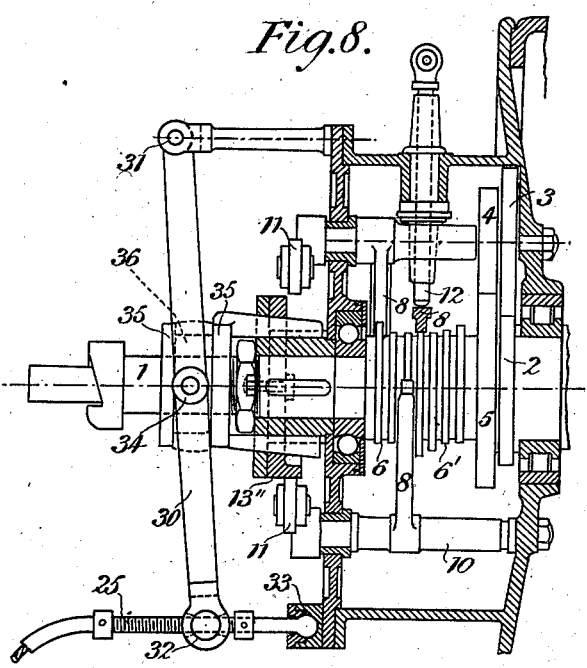

Figs. 7 and 8 illustrate a construction according to the invention adapted for engines with stationary cylinders. The pivoted cam arm rotates with the engine shaft and is moved outwards to engage with the rollers 11 of the arms $9^1$ secured to the rocking shafts 10 and thereby to open the exhaust valves on the compression stroke. The bearings of the rocking shafts are fixed in the stationary crank case. In the example shown, the position of the arm 13" is adjusted by means of a rod 30, pivoted at 31, the free end of the rod terminating in a fork 32 carrying a nut engaging with a screw thread of a bar 25', one end of which is pivoted in a ball and socket joint 33, while the other end is attached to the flexible cable rotated by a hand wheel as shown in Fig. 3.

The rod 30 is forked at 34 to engage with the collars 35 of a tapered sleeve 36, the forked members of which, as the sleeve slides to the left, bring the cam arm into engagement with the rollers 11.

Having thus described the nature of the said invention and the best means I know of carrying the same into practical effect, I claim:—

In a multiple cylinder internal combustion engine, a crank shaft, cam disks arranged in parallel planes on the crank shaft, rocking shafts, two-armed levers on said rocking shaft, one arm of each lever being adapted to engage with one of said cam disks and co-operative with a cylinder exhaust valve to open the latter for the discharge of the burnt gases and the other arm of the lever carrying a roller, a cam lever comprising a pivoted arc-shaped arm slightly eccentric to and shiftable into the path of the said roller, an altitude index, means for setting said index, and means associated with said index setting means and said arc-shaped arm to shift the latter into the path of said roller when said index setting means is actuated.

JOSEPH ZEITLIN.